United States Patent [19]

Lee

[11] Patent Number: 5,712,551
[45] Date of Patent: Jan. 27, 1998

[54] STARTING CIRCUIT PROTECTION APPARATUS AND METHOD FOR BRUSHLESS DC MOTOR COMPRESSOR

[75] Inventor: Kun-bin Lee, Uijeongbu, Rep. of Korea

[73] Assignee: Samsung Electronics Co., Ltd., Suwon, Rep. of Korea

[21] Appl. No.: 567,108

[22] Filed: Dec. 4, 1995

[30] Foreign Application Priority Data

Dec. 2, 1994 [KR] Rep. of Korea ............... 94-32568

[51] Int. Cl.⁶ .................. G05B 5/00; F25B 1/00
[52] U.S. Cl. .................. 318/466; 318/458; 388/815; 62/228.1
[58] Field of Search .................. 318/439, 434, 318/483, 469, 458, 466, 281, 254, 808, 811, 471; 62/131, 132, 133, 230, 236, 180, 181, 158; 388/815, 822

[56] References Cited

U.S. PATENT DOCUMENTS

| | | | |
|---|---|---|---|
| 3,582,648 | 6/1971 | Barry et al. | 318/795 |
| 4,086,558 | 4/1978 | Pejouhy et al. | 318/471 |
| 4,357,988 | 11/1982 | Hudson et al. | 62/180 |
| 4,856,286 | 8/1989 | Sulfstede et al. | 318/811 |
| 4,858,676 | 8/1989 | Bolfik et al. | 62/133 |
| 5,065,587 | 11/1991 | Howland et al. | 62/131 |
| 5,099,654 | 3/1992 | Baruschke et al. | 62/183 |
| 5,255,530 | 10/1993 | Janke | 62/180 |
| 5,463,332 | 10/1995 | Park | 62/157 |
| 5,506,486 | 4/1996 | Hayashi et al. | 318/808 |

*Primary Examiner*—John W. Cabeca
*Attorney, Agent, or Firm*—Burns, Doane, Swecker & Mathis LLP

[57] ABSTRACT

A brushless DC motor compressor starting circuit protecting apparatus for a refrigerator and a method thereof, for controlling excessive current flowing through a coil of a brushless DC motor which is caused by a pressure load of the refrigerator when a compressor starts, before the compressor repeats turning on and off according to a temperature cycle, are provided with a resistor mounted on a circuit board, and a relay for connecting the resistor in series with a motor coil, so that the resistor is connected in series with the coil when a large current flows at an initial driving. Here, a power voltage of a motor driver is divided by a dividing means and an initial-rotation state of the motor is detected by the divided voltage. Therefore, the destruction of a switching device and the demagnetization of a permanent magnet can be prevented and a stable starting can be achieved by restraining the excessive current flowing in the motor coil at the compressor starting.

2 Claims, 6 Drawing Sheets

STARTING CIRCUIT PROTECTION APPARATUS AND METHOD FOR BRUSHLESS DC MOTOR COMPRESSOR

BACKGROUND OF THE INVENTION

The present invention relates to a starting circuit protection apparatus and a method thereof for a brushless DC motor compressor, and more particularly, to a starting circuit protection apparatus and a method thereof for a brushless DC motor compressor of a refrigerator, for controlling excessive current flowing in a coil of the brushless DC motor and which is caused by a pressure load of the refrigerator when its compressor is first turned on.

In a conventional AC compressor, a motor coil is comprised of a main coil and a sub-coil and starting is stabilized by letting current simultaneously flow on both the main and sub-coil by starting both coils. The AC compressor is internally equipped with the sub-coil, a starting capacitor, a driving capacitor and a relay having a positive thermal coefficient, so that an inner volume of the compressor is unnecessarily increased. Also, since the starting capacitor is added to the driving capacitor, they occupy a large space inside a refrigerator.

Further, in a conventional brushless DC motor compressor, since a load due to pressure of the refrigerator becomes very great when the compressor is initially turned on before cycling (i.e., turning on and off according to a temperature cycle of a cold storage or a freezing room), excessive current flows through a coil of the motor. This can cause the demagnetization of a permanent magnet in the brushless DC motor and the destruction of a switching device of the motor driving portion. Also, an adverse compressor starting phenomenon is generated, e.g., the alternating forward and reverse rotations and a forward rotation after a reverse rotation of 90°.

SUMMARY OF THE INVENTION

To solve the above problems, it is an object of the present invention to provide a starting circuit protection apparatus and a method thereof for a brushless DC motor compressor, for preventing the destruction of a switching device and the demagnetization of a permanent magnet and attaining a stable starting, by restraining excessive current induced in a motor coil at start-up time of a compressor, and for preventing the adverse compressor starting phenomenon.

Accordingly, to achieve the above object, there is provided a starting circuit protection apparatus for a brushless DC motor compressor for use in a refrigerator, comprising: a brushless DC motor; a hall sensor for detecting the position of a permanent magnet at a starting of the brushless DC motor; a motor driver for controlling the on/off operation and revolving speed of the brushless DC motor; a switch controller for driving a freezing/cold storage of the refrigerator, a circulating fan, a defrosting heater, a deodorizer and a damper; means for detecting the opening/closing states of each door of a freezing room/cold storage of the; means for detecting the temperature of the freezing room/cold storage; means for detecting the rotation state of the brushless motor by detecting a power voltage of the motor driver; means for controlling the rotation state of the motor using the means for detecting the rotation state of the brushless motor, and controlling the hall sensor, the motor driver, the switch controller, the door detecting and the temperature detecting means.

It is preferred in the present invention that the means for detecting the rotation state of the motor comprises: a first resistor for obtaining the power voltage for driving the DC brushless motor; second and third resistors for dividing the voltage applied across the first resistor; and a capacitor for detecting stably the divided voltage applied across the third resistor and informing the detected voltage to the controller.

Also, to achieve the above object, there is provided a starting method of a brushless DC motor compressor for use in a refrigerator, the compressor comprising a brushless DC motor, a hall sensor, a motor driver, motor rotation state detecting means and controller for the motor, hall sensor, motor driver and motor rotation state detecting means, the method comprising the steps of: starting the compressor by turning on the brushless DC motor; detecting whether the voltage of the brushless motor rotation state detecting means is greater than or equal to a predetermined value; driving a brushless motor coil normally, if the voltage is less than the predetermined value; and turning off and restarting the brushless DC motor, if the voltage is greater than or equal to the predetermined value.

It is preferred in the present invention that the means for detecting the rotation state of the brushless motor comprises a first resistor for obtaining a power voltage for the DC brushless motor driving, second and third resistors for dividing the voltage applied across the first resistor, and a capacitor for detecting stably the divided voltage applied across the third resistor and informing the detected voltage to the controller, and the voltage detecting step comprises the steps of detecting the voltage applied across the third resistor by the controller, including the rotation state of the brushless DC motor as a normal state if the voltage across the third resistor is less than the predetermined value, and judging the rotation state of the motor as an abnormal starting state if the voltage is at least twice that in the normal state or has large ripple constituents.

Further to achieve the above object, there is provided a starting circuit protection apparatus for a brushless DC motor compressor for use in s refrigerator, comprising: a brushless DC motor; a hall sensor for detecting the position of a permanent magnet at a starting of the brushless DC motor; a motor driver for controlling the on/off operation and revolving speed of the brushless DC motor; a starting current controller for restraining excessive current induced in a coil at the motor starting; a switch controller for driving a freezing room/cold storage of the refrigerator, a circulating fan, a defrosting heater, a deodorizer and a damper; means for detecting the opening/closing states each door of the freezing room/cold storage of the refrigerator; means for detecting the temperature of the freezing room/cold; means for detecting the rotation state of the brushless motor by detecting the power voltage of the motor driver; means for controlling the starting current controller by using an output signal of the hall sensor and the means for detecting the rotation state of the motor, and controlling the hall sensor, the motor driver, the switch controller, the door detecting means and the temperature detecting means.

It is preferred in the present invention that the means for detecting the rotation state of the motor comprises: a first resistor for obtaining the a power voltage for driving the DC brushless motor; second and third resistors for dividing the voltage applied across the first resistor; and a capacitor for detecting stably the divided voltage applied across the third resistor and informing the detected voltage to the controller, that the starting current controller comprises a starting resistor of which one terminal is grounded, which has a predetermined resistance value and is capable of being connected in series to the coil of the brushless motor and switching means for connecting the starting resistor in series to the coil, and that the switching means is a relay switch which is controlled by the controller.

In addition, to achieve the above object, there is provided a starting circuit protection method of a brushless DC motor compressor for use in a refrigerator, the compressor comprising a brushless DC motor, a hall sensor, a motor driver, motor rotation state detecting means, a starting current controller having a starting resistor and switching means for connecting the starting resistor in series to a coil of the motor, and controller for connecting the motor, hall sensor, motor driver, motor rotation state detecting means and starting current controller, the method comprising the steps of: connecting in series the starting resistor to the brushless motor coil in a turning-on state of the switching means; starting the compressor by turning on the brushless DC motor; detecting whether the voltage of the brushless motor rotation state detecting means is greater than or equal to a predetermined value; turning off the switching means to ground the motor coil, if the voltage is less than the predetermined value; and turning off the brushless DC motor, if the voltage is greater than or equal to the predetermined value.

It is preferred in the present invention that the switching means is a relay switch, and that the means for detecting the rotation state of the brushless motor comprises a first resistor for obtaining a power voltage for driving the DC brushless motor, second and third resistors for dividing the voltage applied across the first resistor and a capacitor for detecting stably the divided voltage applied across the third resistor and informing the detected voltage to the controller, and wherein the voltage detecting step comprises the steps of detecting the voltage applied across after a value of the third resistor by the controller, judging the rotation state of the brushless DC motor as a normal state if the voltage across the third resistor is less than the predetermined value, and judging the rotation state of the motor as an abnormal starting state if the voltage is at least twice that in the normal state or has large ripple constituents.

BRIEF DESCRIPTION OF THE DRAWINGS

The above objects and advantages of the present invention will become more apparent by describing in detail preferred embodiments thereof with reference to the attached drawings in which.

Detailed Description of the Invention

Figures 1, 1B:
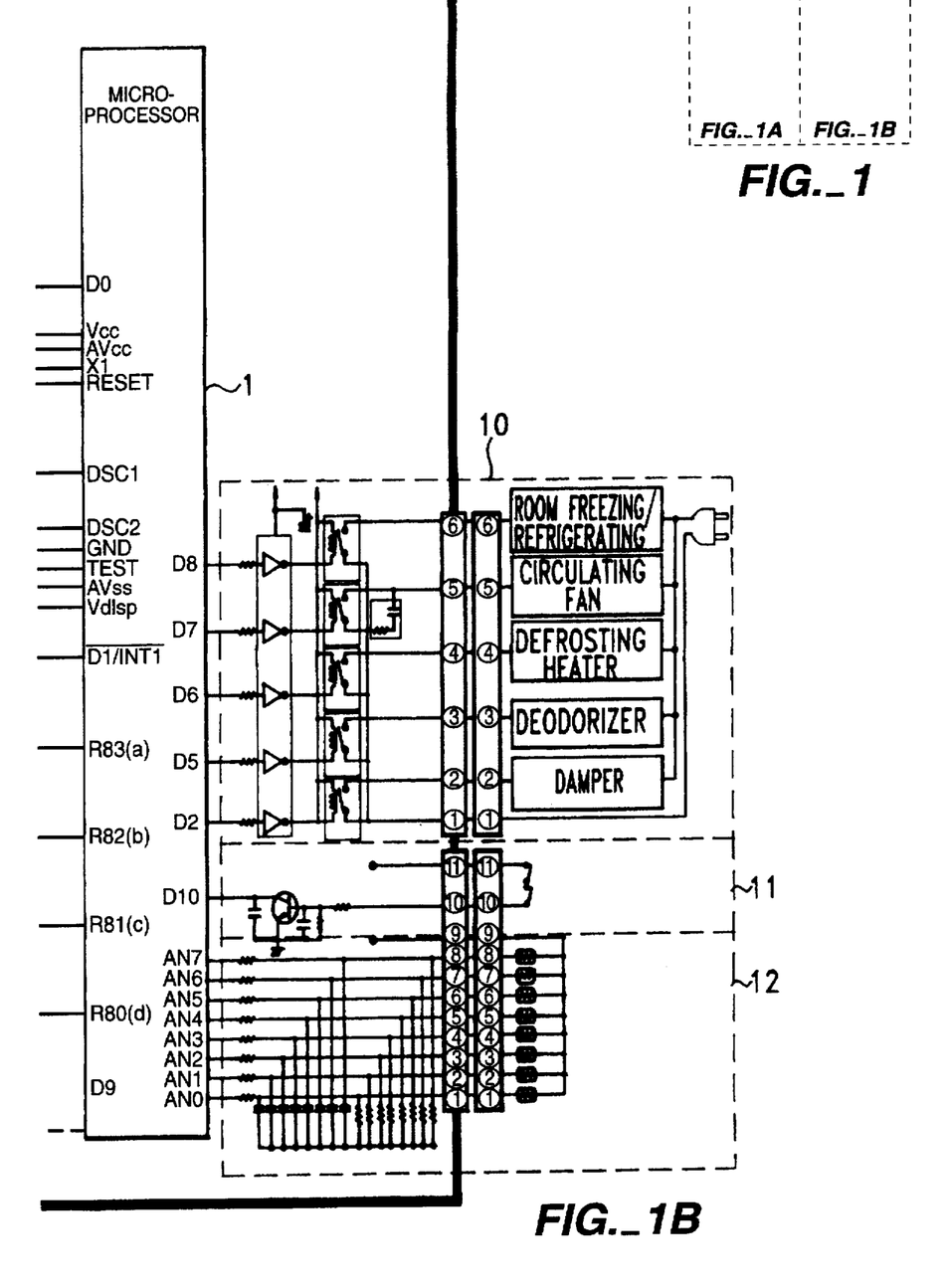
FIG. 1 is a circuit diagram of a starting circuit protection apparatus for a brushless DC motor compressor according to the present invention.
Figure 1A:
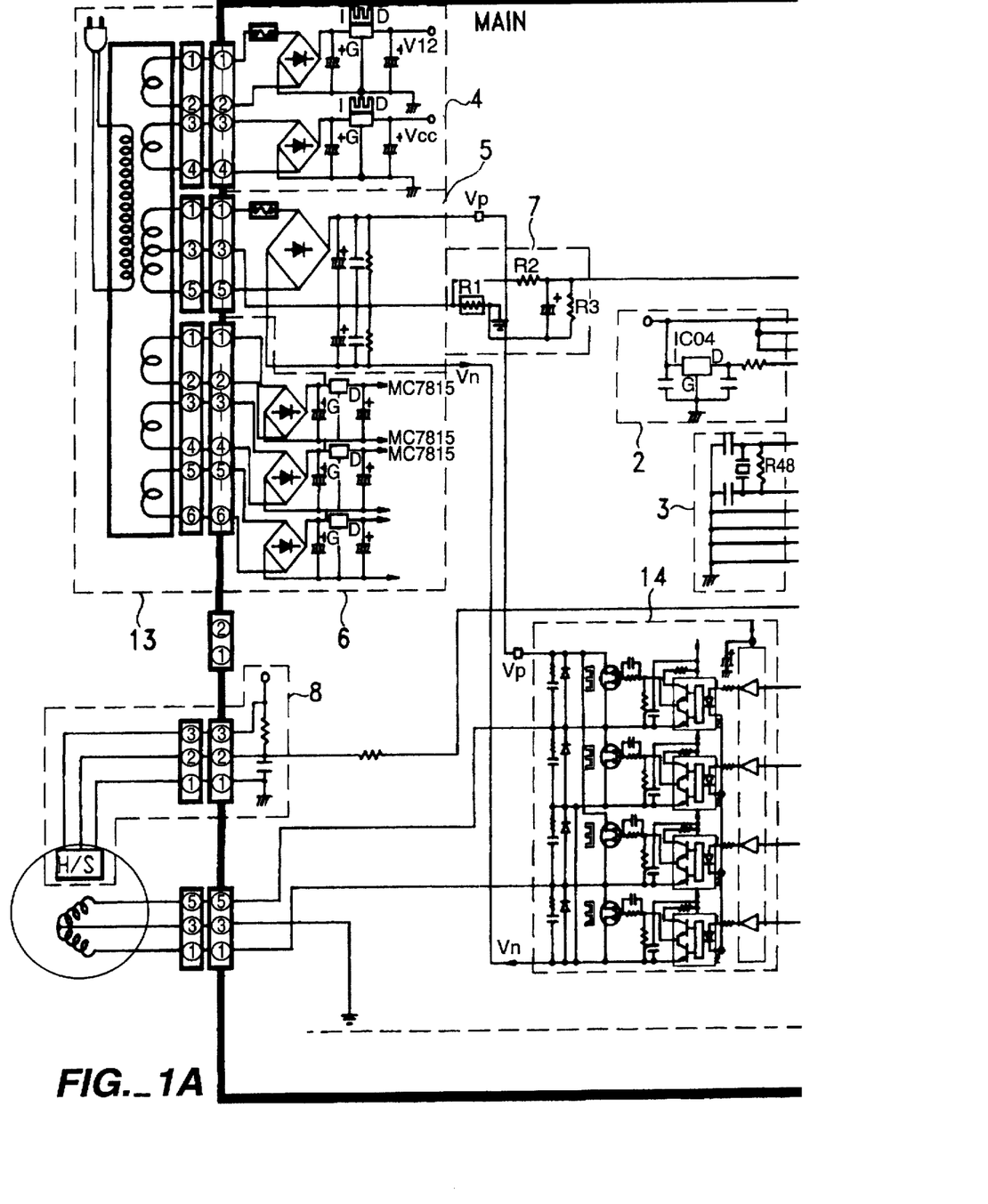

FIG. 1 is a circuit diagram showing a driving circuit for driving a brushless DC motor compressor including a microprocessor for controlling the brushless DC motor and a power unit, in which a rotation state detector 7 for protecting the circuit when the motor starts is provided. Referring to the drawing, a driving circuit protecting apparatus according to the present invention will now be described.

A program is built in a controller 1, which is for detecting and controlling the on/off operation and speed of the brushless DC motor, a compressor controlling function by current detecting, a function of rotation state detector 7 and other functions of a refrigerator.

A microprocessor constituting controller 1 comprises a resetting portion 2 which is required for self-program driving and a crystal oscillator 3. Resetting portion 2 resets the microprocessor into an initial state when the microprocessor completes an operation according to the built-in program or is out of the built-in program. Crystal oscillator 3 provides a basic clock so that the microprocessor normally operates.

A power unit (13, 4, 5 and 6) comprises a power transformer 13 with six second coils for reducing a first input voltage, and a rectifier bridge diode and a smoothing circuit for transforming an AC voltage output of the six second coils of power transformer 13 into DC voltage. The microprocessor, a device controlling power 4, a motor driving power 5 and a motor driver switching device power 6, act as a rectifying/smoothing portion, for transforming AC input voltage into DC voltage. Here, motor driving power 5 is a high voltage portion used for driving the brushless DC motor and motor driving switching device power 6 is a voltage portion used exclusively for a switching device of a brushless DC motor driver 14.

A brushless DC motor rotation state detector 7 detects voltage of motor driving power 5 by using a resistor R1. The voltage across resistor R1 in driving the compressor is divided by a resistor R2 and a resistor R3. Controller (microprocessor) 1 reads the voltage across resistor R3, determines whether the brushless DC motor rotates normally and detects whether abnormal starting such as a reverse rotation of the compressor is generated. When the brushless motor normally operates, the voltages across resistor R1 and R3 appear relatively low, while in the case of reverse rotation, more than double the voltage of that in the normal rotation is applied across resistors R1 and R3, respectively. When the motor rotates forward, the voltage of resistor R3 becomes about 1V and microprocessor 1 recognizes the divided voltage (1V) using R2 and R3 as a forward rotation. If voltage or more than the above voltage is ripple voltage input, the microprocessor regards the motor of the compressor as being in an abnormal starting such as a reverse rotation to turn off a pulse width modulation (PWM) output signal and so that the operation of the compressor is stopped.

A hall sensor detector 8 determines how to output a PWM output waveform of brushless DC motor driver 14 by detecting the position of a permanent magnet at the initial driving of the brushless motor. Since the output of a square waveform is characterized according to the alternation of the position of the permanent magnet from N to S pole, it is judged whether abnormal rotation is performed by detecting the motor's speed from the frequency of the square waveform.

A first switching controller 10 for controlling various functions in the refrigerator comprises a defrosting heater, a freezing/cold storage controller, a circulation fan, a deodorizer controller and a damper controller.

A freezing room/cold storage detector 11 detects the opening/closing state of the doors of the freezing room/cold storage of the refrigerator.

A freezing room/cold storage temperature detector 12 determines the on/off cycle of the compressor by detecting the temperature of the freezing room/cold storage to maintain that of the freezing room/cold storage.

Brushless DC motor driver 14 can control the on/off operation of the brushless DC motor and vary the speed of the motor by receiving the PWM output signal from the microprocessor, and is comprised of a power switching device, e.g., POWER TR, POWER MOSFET or IGBT, which can switch the voltage of motor driving power 5.

The starting circuit protecting apparatus of the brushless DC motor compressor having such a structure will be described referring to drawings.

Figure 3:
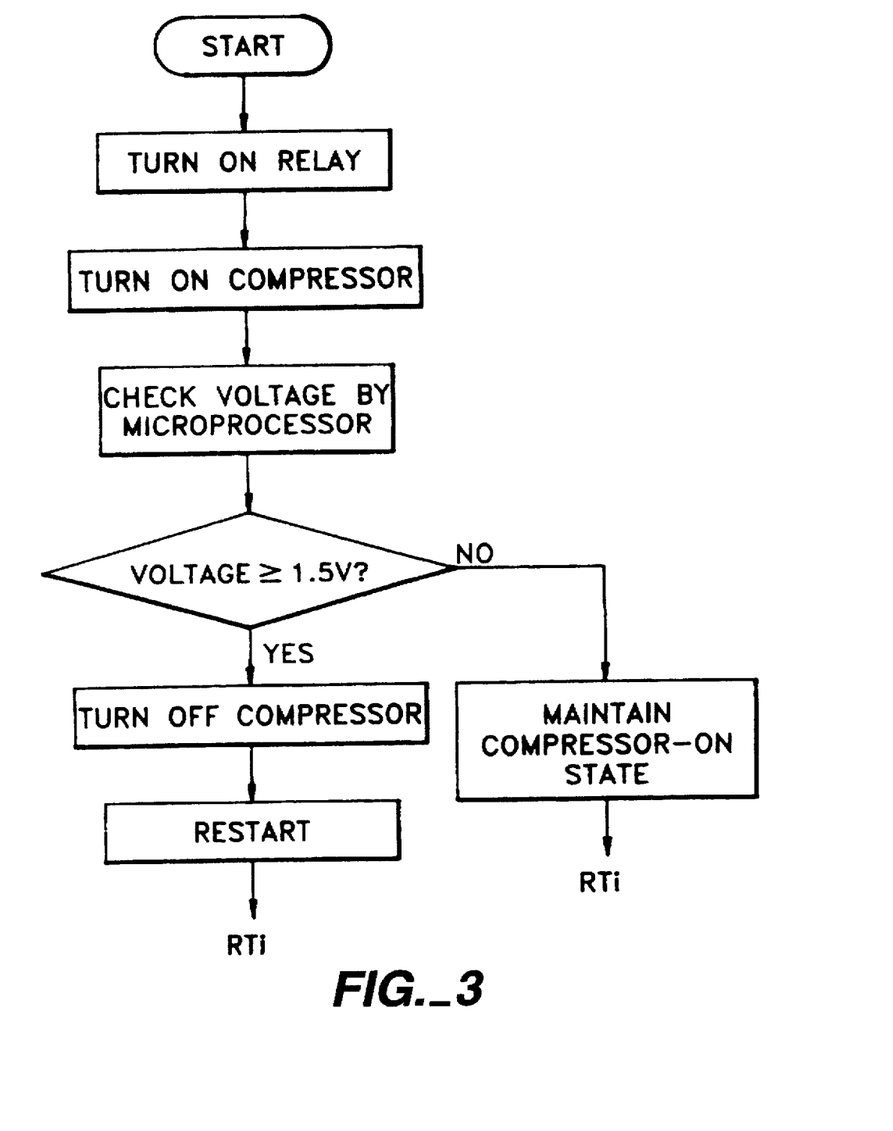
FIG. 3 is a flowchart for explaining a method of controlling starting current by detecting voltage of the rotation state detector of FIG. 1.

FIG. 3 is a flowchart explaining a controlling method of starting current by using voltage detected by the motor rotation state detector of FIG. 1. That is, an abnormal current generated due to, the abnormal starting such as a reverse rotation of the brushless motor when the compressor is operated, is detected by using the voltage applied across resistor R1 which is connected to the motor coil. Here, when a higher voltage than a preset voltage (reference voltage in a normal operation) is applied across R1, the compressor is turned off by turning off the output PWM signal of motor driver 14.

The current value in a normal operation of the DC brushless motor varies between 0.5–1.4 A according to the speed which is between 1800–4500 rpm. Accordingly, when the divided resistances of resistors R2 and R3 are set as 1V using the above current values as a reference, the compressor is turned off at 1.5V and over regarding the corresponding current state as the abnormal starting. When the motor rotates reversely, the cycle (discharge and suction) of the compressor being contrary, current of more than three times as much as that in a normal rotation appears. Also, when the motor alternates forward and reverse rotations at the time of starting, instant peak voltages are continuously recognized so that the operation of the compressor is turned off.

Figures 2, 2B:
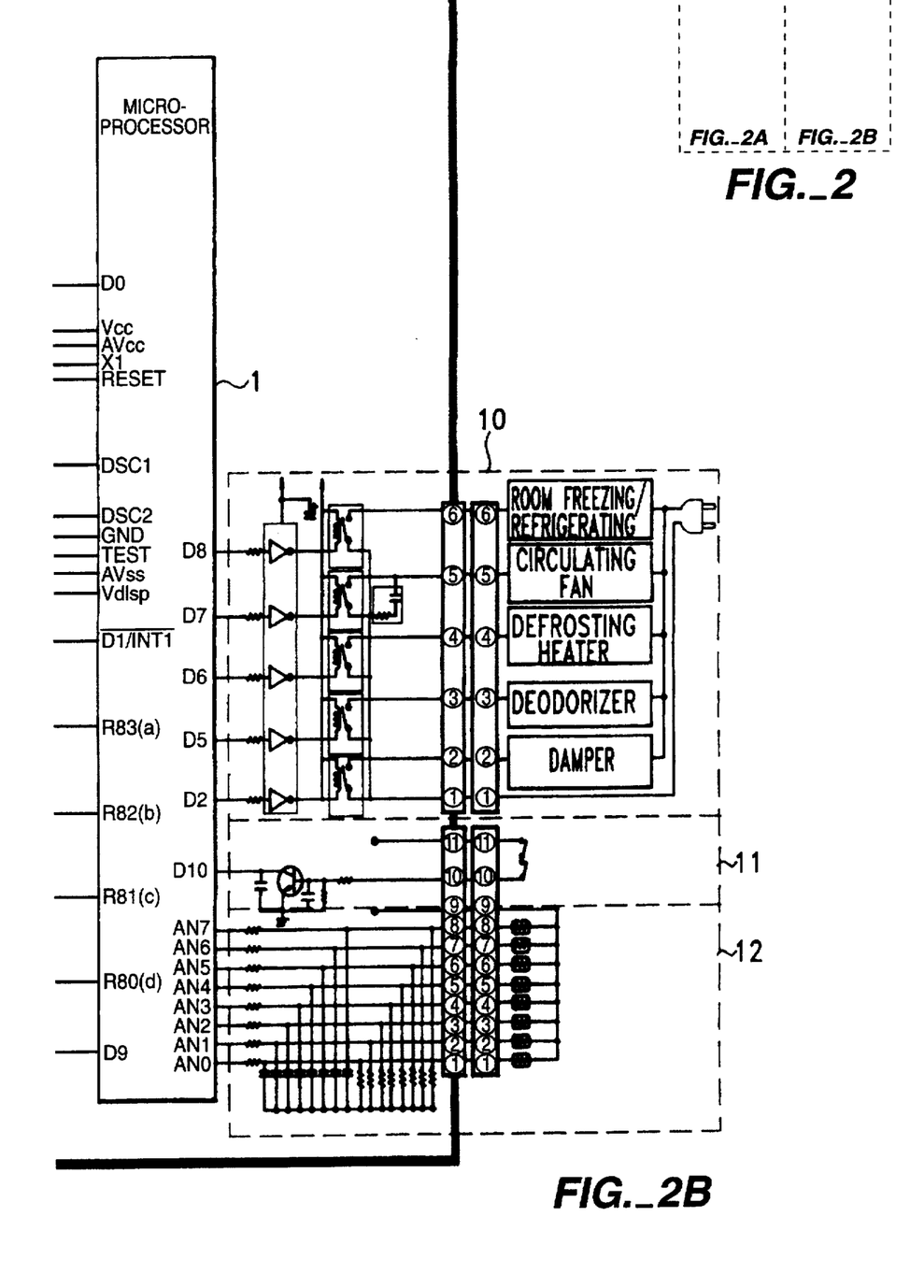
FIG. 2 is a circuit diagram of another starting circuit protection apparatus for a brushless DC motor compressor according to the present invention.
Figure 2A:
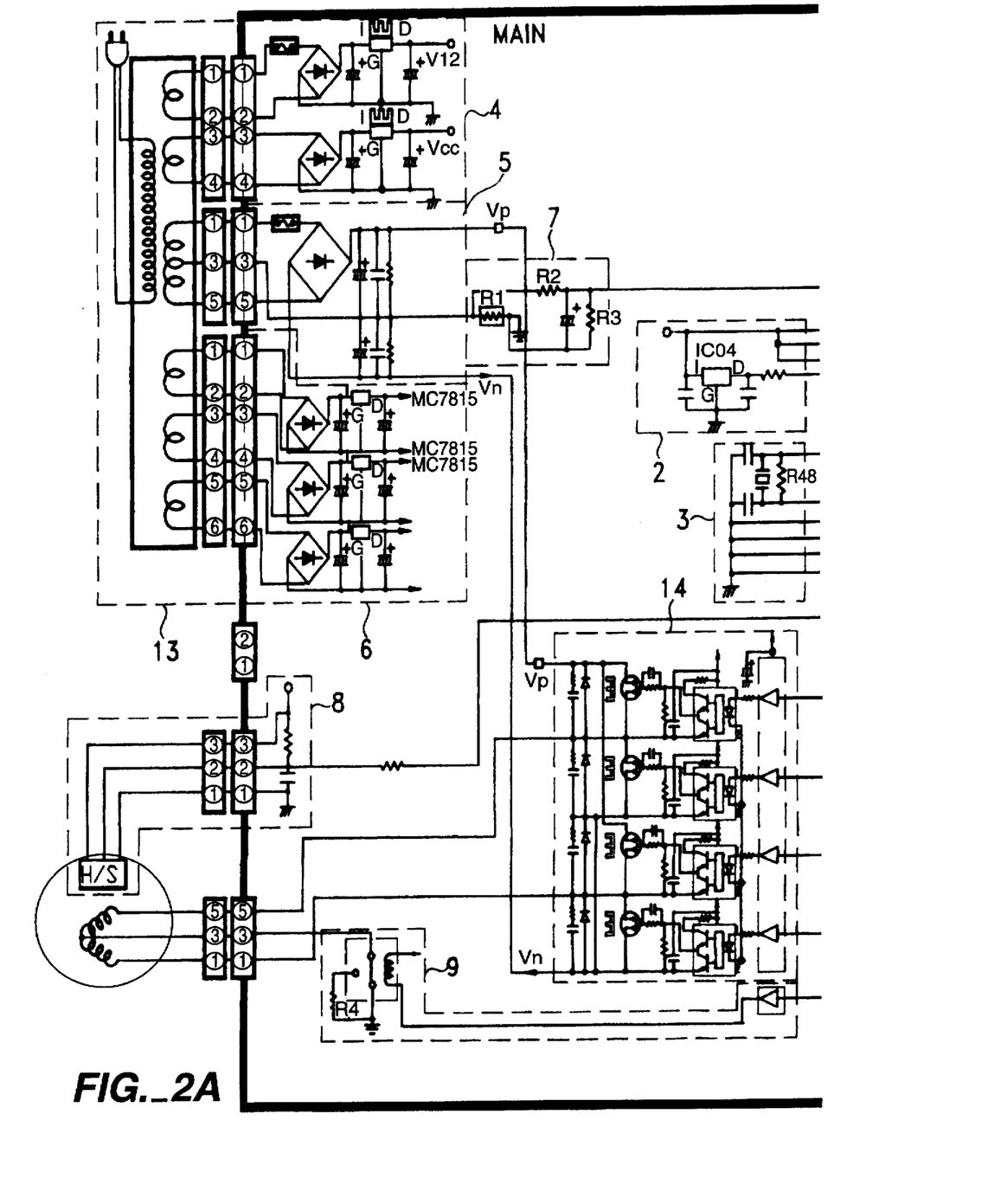

FIG. 2 shows a circuit diagram of another brushless DC motor compressor starting circuit protecting apparatus according to the present invention. A starting current controller 9 is further comprised in the invention of FIG. 1 including motor rotation state detector 7, as shown in FIG. 2, so that a more effective compressor starting circuit protecting apparatus can be attained. Starting current controller 9 is described in detail hereinbelow.

Starting current controller 9 is a circuit for preventing an abnormal starting such as a reverse rotation and the demagnetization of the permanent magnet by controlling excessive current induced in a coil of the brushless motor at the compressor starting. Such a control can be achieved by two methods. Since when the compressor is first turned on, current flows through the coil of the brushless DC motor, the abnormal starting such as a reverse rotation may occur by starting torque when the compressor starts. In order to avoid this occurrence, a starting resistance R4 is connected in series utilizing a relay at the starting and then driven so that the excessive current is restrained with resistor R4, to thereby stabilize the initial starting of the compressor.

The controlling method of starting resistor R4 will be described with reference to the flowcharts of FIGS. 4 and 5.

Figure 4:
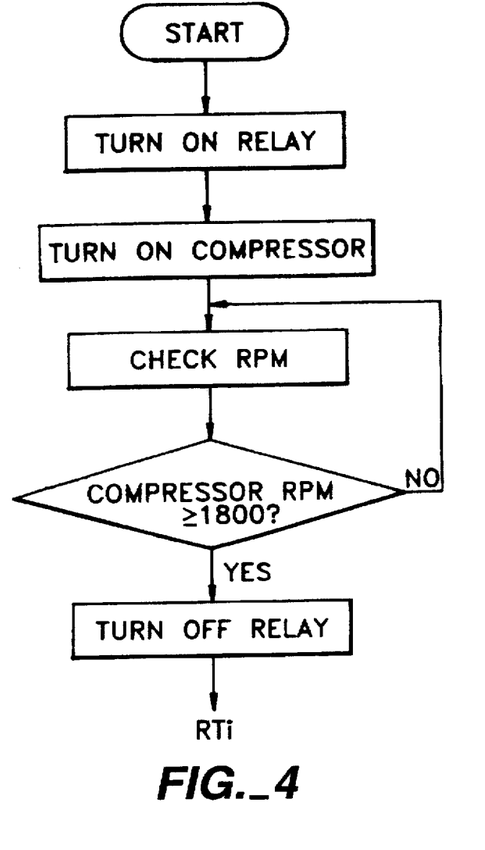
FIG. 4 is a flowchart for explaining a method of controlling starting current of the starting current controller of FIG. 2, by using the motor speed.

FIG. 4 shows a controlling method by the feedback of the speed of the motor. In the method, a relay-on signal is primarily output to microprocessor 1 before a PWM output waveform is output to a driving portion in an initial driving stage of the motor. Then, the driving of the compressor is identified through hall sensor 8 by outputting the PWM output waveform. When the microprocessor detects that the speed of the compressor motor reaches 1800 rpm by referring to the output waveform (square waveform) of the hall sensor after the compressor starts, a relay-off signal is output to turn off starting resistor R4. Here, the hall sensor detects the position of a permanent magnet in the brushless DC motor and the output of the hall sensor alternates from "high" to "low" in the revolution of the motor. Thus, the speed (in rpm) is calculated by counting the "high" pulses.

Figure 5:
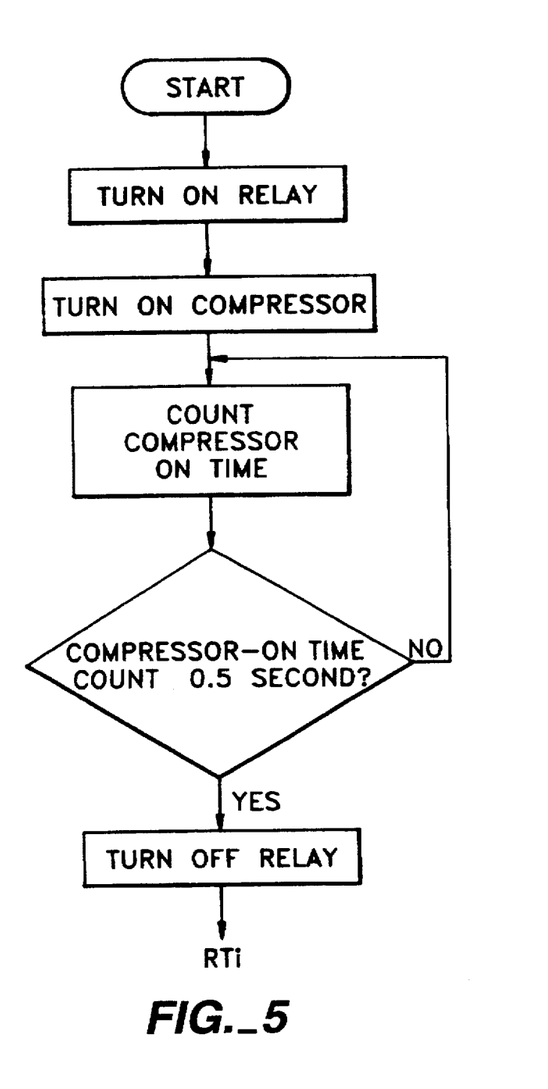
FIG. 5 is a flowchart for explaining a method of controlling starting current of the starting current controller of FIG. 2, by using the starting time of a compressor.

FIG. 5 shows a controlling method of the starting resistor R4 by compressor starting time. Generally, a current at the starting of the compressor becomes very large, exceeding 10A. The time required to reach a preset stabilized speed is within 0.5 seconds and thus the time required to drop to a normal operating current value after the initial driving is also about 0.5 seconds. Though this method adopts the same principle as that of FIG. 4, the starting resistor is controlled with the time required for the compressor to reach a stable driving speed.

As described above, according to the present invention, starting current controller 9 utilizes motor rotation state detector 7 so as to provide an effective compressor starting circuit protecting apparatus, the controlling method of which is will be described.

As shown in FIG. 3, when an abnormal high voltage generated due to an abnormal starting such as a reverse rotation across resistor R1, or the coil of the brushless motor, is detected, the compressor is turned off by turning off the output PWM signal of motor driver 14. More particularly, when a higher voltage than a preset voltage (reference voltage in a normal operation) is detected across resistor R1, the compressor is turned off. Alternatively, the abnormal high current can be adjusted while passing through resistor R4. If the voltage applied across resistor R1 becomes less than the preset voltage, which means that the compressor normally operates, the relay switch connected to starting resistor R4 is switched to be directly grounded.

That is, the current value in a normal operation of the DC brushless motor varies between 0.5–1.4 A according to the speed between 1800–4500 rpm. Accordingly, when the divided resistances of resistors R2 and R3 are set as 1V using the above current value as a reference, the compressor is turned off at 1.5V and over regarding the corresponding current state as the abnormal starting such as a reverse rotation. Alternatively, the corresponding current can be adjusted while passing through resistor R4. Also, when the motor rotates reversely, the cycle (discharge and suction) of the compressor being contrary, current of more than three times as much as that in a normal rotation appears. Also, when the motor starts improperly, i.e., alternating forward and reverse rotations, an instant peak voltage is continuously recognized. In these cases, the operation of the compressor is stopped, or the current is adjusted using resistor R4.

As described above, the starting circuit protecting apparatus and method for the brushless DC motor compressor according to the present invention has merits in that the destruction of a switching device and the demagnetization of the permanent magnet can be prevented and a stable starting can also be achieved by restraining in the resistor the excessive current flowing in the motor coil in a compressor starting.

What is claimed is:

1. A starting method of a brushless DC motor compressor for use in a refrigerator, said compressor comprising a brushless DC motor, a hall sensor, a motor driver, motor rotation state detecting means and controller for said motor, hall sensor, motor driver and motor rotation state detecting means, said method comprising the steps of:

starting said compressor by turning on said brushless DC motor;

detecting whether the voltage of said brushless motor rotation state detecting means is greater than or equal to a predetermined value;

driving a brushless motor coil normally, if the voltage is less than the predetermined value; and turning off and restarting said brushless DC motor, if the voltage is greater than or equal to the predetermined value, wherein said means for detecting the rotation state of said brushless motor comprises a first resistor for obtaining a power voltage for said DC brushless motor driving, second and third resistors for dividing the voltage applied across said first resistor, and a capacitor for detecting stably the divided voltage applied across said third resistor and informing the detected voltage to said controller, wherein said voltage detecting step comprises the steps of detecting said voltage applied across said third resistor by said controller, including the rotation state of said brushless DC motor as a normal state if the voltage across said third resistor is less than the predetermined value, and judging the rotation state of said motor as an abnormal starting state if the voltage is at least twice that in the normal state or has large ripple constituents.

2. A starting circuit protection method of a brushless DC motor compressor for use in a refrigerator, said compressor comprising a brushless DC motor, a hall sensor, a motor driver, motor rotation state detecting means, a current controller having a starting resistor and switching means for connecting said starting resistor in series to a coil of said motor, and a controller for connecting said motor, hall sensor, motor driver, motor rotation state detecting means and starting current controller, said method comprising the steps of:

connecting in series the starting resistor to the brushless motor coil in a turning-on state of the switching means;

starting the compressor by turning on the brushless DC motor;

detecting whether the voltage of said brushless motor rotation state detecting means is greater than or equal a predetermined value;

turning off said switching means to ground said motor coil, if the voltage is less than the predetermined value; and turning off said brushless DC motor, if the voltage is greater than or equal to the predetermined value, wherein said means for detecting the rotation state of said brushless motor comprises a first resistor for obtaining a power voltage for driving said DC brushless motor, second and third resistors for dividing the voltage applied across said first resistor and a capacitor for detecting stably the divided voltage applied across said third resistor and informing the detected voltage to said controller, and wherein said voltage detecting step comprises the steps of detecting said voltage applied across after a value of said third resistor by said controller, judging the rotation state of said brushless DC motor as a normal state if the voltage across said third resistor is less than the predetermined value, and judging the rotation state of the motor as an abnormal starting state if the voltage is at least twice that in the normal state or has large ripple constituents.

* * * * *